United States Patent [19]
Montag et al.

[11] Patent Number: 5,387,645
[45] Date of Patent: Feb. 7, 1995

[54] POLYPHTHALAMIDE COMPOSITION

[75] Inventors: Ruth A. Montag; George A. Corbin, both of Naperville, Ill.

[73] Assignee: Amoco Corporation, Chicago, Ill.

[21] Appl. No.: 168,873

[22] Filed: Dec. 16, 1993

Related U.S. Application Data

[60] Division of Ser. No. 21,303, Feb. 23, 1993, abandoned, which is a continuation-in-part of Ser. No. 585,879, Sep. 20, 1990, abandoned.

[51] Int. Cl.⁶ .............................................. C08L 77/10
[52] U.S. Cl. ........................................ 525/66; 525/179
[58] Field of Search .......................................... 525/66

[56] References Cited

U.S. PATENT DOCUMENTS

| | | | |
|---|---|---|---|
| 4,849,471 | 7/1989 | Saito et al. | 525/66 |
| 4,990,564 | 2/1991 | Taubitz et al. | 525/66 |
| 5,071,924 | 12/1991 | Koch et al. | 525/432 |

*Primary Examiner*—Ana L. Carrillo
*Attorney, Agent, or Firm*—Richard J. Schlott; Stephen L. Hensley

[57] ABSTRACT

Filled and unfilled polyamide compositions of improved toughness comprise a blend of a polyamide comprising recurring aliphatic terephthalamide units, a functionalized polyolefin and a functionalized block copolymer comprising styrene polymer blocks and rubber blocks comprising ethylene/propylene ethylene/butylene or ethylene/pentylene polymer blocks or a combination thereof.

13 Claims, No Drawings

POLYPHTHALAMIDE COMPOSITION

CROSS-REFERENCE TO RELATED APPLICATIONS

This application is a division of pending U.S. application Ser. No. 08/021,303, filed Feb. 23, 1993, now abandoned, which was a Continuation in part of U.S. application Ser. No. 07/585,879, filed Sep. 20, 1990, now abandoned.

BACKGROUND OF THE INVENTION

This invention relates to polyphthalamide compositions of improved toughness. More particularly, the invention relates to toughened compositions comprising a blend of a high melting, crystalline polyamide, a toughener comprising a functionalized polyolefin and a functionalized block copolymer synergist for the toughener. Still more particularly, the polyamide component is a copolymer comprising terephthalamide repeating units, while the block copolymer synergist comprises polymerized styrene blocks and rubber blocks comprising ethylene/propylene, ethylene/butylene or ethylene/pentylene polymer blocks.

As is known, polyamides generally exhibit a balance of thermal, strength and stiffness properties which make them suitable for many applications. Crystalline polyamides comprising at least about 50 mole percent aliphatic diamine terephthalamide units exhibit particularly good thermal properties making them particularly useful in relatively high temperature applications such as under-the-hood automotive parts. Other desirable properties of such compositions include their high strength and stiffness. However, impact strengths of these polyphthalamides are typically low as measured by mechanical tests such as the Notched Izod Impact Test or the high speed instrumented Dart Impact Test. In addition, the elongation of most such polyphthalamides as measured in tensile testing is also relatively low, indicating low ductility. Improvements in impact strength and elongation are needed for better performance of articles fabricated from polyphthalamides for use in high impact applications and especially those in which the articles may be subject to cracks or have imperfections. Further, such polyphthalamides have relatively high melting points e.g., about 290° C. or higher, and degradation temperatures of some of the materials do not greatly exceed their melting points. Melt fabrication of these resins such as by extrusion or injection molding is thus more difficult and complex than those for lower melting polyamides such as nylon 66 which melts at about 260°–265° C.

Various additives have been proposed for improving impact strength and melt processability of polyamides. Generally, these additives are rubbery compositions that can be blended or incorporated into the polyamides to provide improvements in impact strength. Of course, it also is important that such improvements be achieved without substantial adverse effects on desirable properties of the polyamide. It also is important that the additives retain their effectiveness after processing of polyamide compositions containing the same and during use of articles prepared therefrom.

U.S. Pat. No. 4,427,828 issued Jan. 24, 1984, and U.S. Pat. No. 4,508,874, issued Apr. 2, 1985, both to Hergenrother et al., disclose impact resistant polyamide compositions containing about 50–90 wt.% polyamide having a number average molecular weight of at least 10,000 and about 10–50 wt. % of a pendant succinic anhydride group-containing reaction product of maleic anhydride with a hydrogenated polymer of a conjugated diene or hydrogenated random or block copolymer of a conjugated diene and a vinyl aromatic hydrocarbon. The disclosed hydrogenated polymer or copolymer has about 0.5–20% of its original unsaturation content before hydrogenation and at least 5 wt. % of the polyamide and the maleic anhydride-hydrogenated polymer or copolymer reaction product is present in the form of a graft polymer containing at least 20% polyamide. Polyamides mentioned in the patent include those prepared from various aminocarboxylic acids or lactams thereof or from dicarboxylic acids and diamines, including polycaprolactam, poly(hexamethylene adipamide), poly(hexamethylene isophthalamide), "poly(methoxylylene adipamide)" and hexamethylene adipamide/caprolactam, hexamethylene adipamide/hexamethylene isophthalamide, hexamethylene adipamide/hexamethylene terephthalamide, hexamethylene adipamide/hexamethylene azeleamide copolyamides and hexamethylene adipamide/hexamethylene azeleamide/caprolactam terpolyamides. Examples of various maleic anhydride-hydrogenated diene polymer and diene-vinyl aromatic copolymer adducts also are given. Included are those in which the diene is butadiene and the vinyl aromatic is styrene.

U.S. Pat. No. 4,783,503 issued Nov. 8, 1988, to Gergen et al. discloses impact resistant blends of a polyamide and a thermally stable, modified, selectively hydrogenated, block copolymer of a conjugated diene and a vinyl aromatic compound. The polyamides are semicrystalline or amorphous resins having molecular weights of at least 5000. Polyamides named in the patent include poly(hexamethylene adipamide), poly(hexamethylene dodecaneamide), polycaprolactam, and adipic acid/isophthalic acid/hexamethylene diamine copolyamides. The disclosed, modified, selectively hydrogenated, block copolymer component has residual unsaturation in the polydiene block of about 0.5–20% of its original unsaturation content and is grafted in the vinylarene block with an electrophilic group. Examples of various dienes, vinyl aromatics and electrophiles are disclosed and the examples of the patent illustrate an acid-functionalized styrene-ethylene/butylene-styrene block copolymer containing 29 wt. % styrene and blends thereof with a commercial nylon 66 prepared at temperatures up to 285° C. The modified, hydrogenated block copolymers are said to exhibit greater thermal stability than materials prepared by the ENE process such as in Hergenrother et al.

Published European Patent Application 86201336.4 (Publication No. 0 211 467) of Gelles et al., published Feb. 25, 1987, discloses impact resistant polymeric compositions containing a polyamide or polyester and a thermally stable, acid-functionalized, selectively hydrogenated block copolymer of a vinyl aromatic compound and a conjugated diene in which unsaturation in the polydiene block is less than 10% of its original unsaturation and substantially all of the acid groups or derivatives thereof are grafted to a secondary or tertiary carbon of the polydiene group. Various polyamides, including poly(hexamethylene adipamide), poly(hexamethylene isophthalamide), poly(hexamethylene dodecaneamide), polycaprolactam and adipic acid/isophthalic acid/hexamethylene diamine and polyhexamethylene ter-co-isophthalamide copolyamides, are mentioned. Various diene and vinyl aromatic monomers are disclosed for preparation of block copolymers, 1,3-butadiene and styrene, respectively, being identified as preferred. The polydiene block is selectively hydrogenated and the hydrogenated result is grafted with an acid group or derivative to provide functionality. Preferred monomers for the grafting reaction are said to be maleic anhydride, maleic acid, fumeric acid and their derivatives and sulfonic acids. The examples illustrate maleic anhydride-functionalized styrene-ethylene/butylene-styrene block copolymer blends with nylon 66 prepared at temperatures up to 285° C. and having improved Izod impact strength relative to the neat nylon 66. Like the modified, hydrogenated block copolymers used according to Gergen et al., those of Gelles et al. are said to exhibit improved thermal stability relative to modified polymers prepared by the ENE process such as those according to Hergenrother et al.

A published advertisement for Kraton ® FG 1901X by Shell Chemical Company, appearing in *Plastics Compounding*, March/April, 1989, discloses a block copolymer having styrene and ethylene/butylene polymer blocks functionalized with maleic anhydride and utility thereof as an impact modifier for engineering thermoplastics, as a tie layer and as a compatibilizer for dissimilar scrap thermoplastics. Improvement in Izod impact strength resulting from incorporation of the material into nylon 66 also is reported in the advertisement as is the material's ability to withstand processing temperatures of engineering thermoplastics.

British Patent Specification 998,439 to E. I. duPont de Nemours and Company discloses blends of polyamides with olefin copolymers containing acid groups. The blends are described as having improved toughness as measured by the Izod Impact Test. The polyamides used according to this specification are derived from dicarboxylic acids and diamines, with nylon 66, 610, 6, 66/610 and 66/6 identified as preferred materials. The olefin copolymers are derived from 1-olefins, such as ethylene, propylene, butene-1, isobutene and styrenes or mixtures of 1-olefins, and an acidic component which may be incorporated by copolymerization with the olefin or by grafting to a polyolefin. Acidic components include alpha, beta-unsaturated carboxylic acids, such as acrylic acid, methacrylic acid, ethacrylic acid, maleic acid, and esters and anhydrides thereof and sulfonic acid group-providing compounds such as concentrated sulfuric acid and $SO_2Cl_2$. The olefin-acid group copolymer and polyamides are blended to finely disperse the former in the polyamide. The blends are described as incompatible but showing evidence of reaction between amine or acid end groups of the polyamide and acid groups of the olefin-acid component. The blends are said to contain 1–50% olefin-acid polymer and 50–90% polyamide.

U.S. Pat. No. 3,780,140 to Hammer, issued Dec. 18, 1973, discloses blends of ethylene-carbon monoxide-termonomer polymers with organic polymers, including polyamides, to improve properties of the latter in various respects, including toughness. As termonomers used in preparing the polymers, unsaturated mono- and dicarboxylic acids of 3–20 carbon atoms and esters thereof, vinyl esters of $C_{1-18}$ saturated acids, vinyl $C_{1-18}$ alkyl ethers, acrylonitrile, methacrylonitrile and copolymerizable unsaturated hydrocarbons such as $C_{3-12}$ alpha-olefins are disclosed.

U.S. Pat. No. 4,174,358 to Epstein, issued Nov. 13, 1979, discloses compositions containing a polyamide having a molecular weight of at least 5,000 prepared from saturated $C_{4-12}$ dicarboxylic acids and $C_{4-15}$ diamines and a polymer dispersed in the polyamide as discrete particles 0.01 to 1 micron in size, having sites that adhere to the polyamide and tensile modulus of 1 to 20,000 and wherein the ratio of the polyamide tensile modulus to that of the polymer is greater than 10:1. The polymers dispersed in the polyamide are said to be represented by the formula $A_{(a)}$—$B_{(b)}$—$C_{(c)}$—$D_{(d)}$—$E_{(e)}$—$F_{(f)}$—$G_{(g)}$—$H_{(h)}$ wherein (a)–(h) are specified numerical values and repeat units A–H are also specified monomers from which the polymers are said to be derived. Compositions according to this patent are said to have improved ductility as measured by the Izod Impact Test.

U.S. Pat. No. 3,842,029 to Yokohama et al., issued Oct. 15, 1974, discloses noise, skid and impact resistant compositions containing glass fibers, certain thermoplastic polymers, including polyamides, and conjugated diene-monovinyl aromatic block copolymers. Disclosed polyamides include nylon 6, 66, 7, 610, 612, 11 and 12. Disclosed block copolymers include styrene-butadiene, styrene-isoprene, 1,3-pentadiene-vinyl toluene or 1,3-pentadiene-vinyl naphthalene copolymers.

U.S. Pat. No. 4,423,186 to Grigo et al., issued Dec. 27, 1983, discloses impact resistant polyamide molding compositions containing 35–99 weight % polyamide and 1–65 weight % of a partly crosslinked mixture of 5–80 weight % ethylene/(meth)acrylic acid (esters) and 95–20 weight % polybutadiene rubber. Disclosed polyamides are nylon 6, 66 and 6/66 copolymers.

Although these patents and publications disclose various additives for improving impact strength and ductility of various polyamides, there remains a need for improved modifiers for use with polyamides containing a substantial proportion of terephthalamide units, particularly in view of the relatively high melting points and often narrow melt processing temperature ranges thereof which limit utility and effectiveness of many materials heretofore proposed as impact modifiers. In this regard, it is noted that Gergen et al. and Gelles, despite emphasizing improved thermal stability of their additives, as discussed hereinabove, illustrate use of such additives only with lower melting nylon 66 resins at temperatures of 285° C. or lower in their respective examples. Similarly, while the Shell Chemical Company advertisement for Kraton ® FG 1901X mentions capability of the material to stand up to high processing temperatures, the supplier's Material Safety Data Sheet (MSDS 2,898-1, Jun. 22, 1987) for the product cautions against processing above 287° C.

Functionalized polyolefin modifiers are known to be useful in improving the processability and ductility of polyamides. However, these low cost modifiers have not been found to be particularly effective in improving the impact of polyamides, and particularly polyphthalamides. U.S. Pat. No. 4,849,471 to Saito et al., issued Jul. 18, 1989, discloses that a combination of hydrogenated block copolymers and functionalized ethylene-containing polymers is effective in improving the impact and moldability of polyamides. The impact-modified polyamide compositions disclosed by patentee include a 50/50 copolymer of hexamethylene polyterephthalamide and hexamethylene polyisophthalamide modified with a blend of hydrogenated block polymer and functionalized hydrogenated block polymer. However, hydrogenated block copolymers are rather costly modifiers when compared with polyolefins and their copolymers such as ethylene-propylene copolymers and ethylene-propylene-diene terpolymers, and such blends find reduced acceptability for use in a wide variety of applications where cost is an important factor.

Blends comprising polyphthalamides and functionalized polyolefins exhibit a desirable balance of mechanical properties including good ductility and retain these properties when employed in applications where extended use at elevated temperatures is contemplated. In addition, such blends have good melt processability and are significantly lower in cost. However, these polyphthalamide blend formulations are generally low in impact. A method for toughening blends is thus necessary if these low-cost formulations are to gain wide commercial acceptance for use in the production of molded and extruded goods.

BRIEF SUMMARY OF THE INVENTION

Blends comprising a crystallizable polyamide having at least about 50 mole percent recurring aliphatic diamine terephthalamide units and a functionalized polyolefin are toughened when further blended with a functionalized block copolymer synergist.

Inasmuch as the block copolymer synergistically improves the impact properties of invented compositions, providing significant improvements in toughness, including impact strength as determined by the Izod impact test and ductility as indicated by elongation during tensile testing relative to blends comprising only the polyphthalamide and the functionalized polyolfin, only relatively low levels of block copolymer are required. These improvements are frequently achieved despite preparation and processing of the invented compositions at temperatures approaching or even exceeding nominal degradation temperatures of the modifier components. In addition the compositions not only retain their desirable properties, including improved Izod impact strengths, over a wide temperature range up to at least about 120° C., but also exhibit excellent retention of tensile strength, flexural modulus and Izod impact strength when wet or subjected to humid environments.

DETAILED DESCRIPTION OF THE INVENTION

Briefly, the invented compositions comprise a blend of a polyphthalamide comprising recurring aliphatic diamine terephthalamide units, a functionalized polyolefin and a pendant succinic anhydride-functionalized block copolymer. The functionalized polyolefin and the block copolymer synergist are present as a discontinuous phase within a matrix or continuous phase comprising the polyphthalamide component. Such compositions can be prepared by combining and thermally processing the polyphthalamide and the polyolefin and block copolymer modifier components and may be useful for thermally fabricated articles, such as injection-molded or extruded automotive under-the-hood parts and the like intended for use in applications requiring a high degree of toughness, strength and thermal resistance.

In greater detail, the polyphthalamide component of the invented compositions is a crystallizable polyamide comprising at least about 50 mole percent recurring aliphatic diamine terephthalamide units which may be further described as represented by the formula

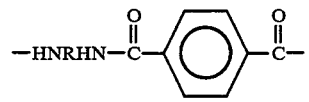

wherein R comprises at least one aliphatic hydrocarbyl radical. The polyphthalamide component generally has a molecular weight of at least about 5,000 and preferably is amine-terminated to facilitate incorporation of the modifying component into the polyphthalamide component. However, acid-terminated polyphthalamide components also are suitable because preparation of the invented compositions typically results in minor, though adequate, cleavage of carbonamide linkages and, in turn, generation of reactive amine end groups, to ensure suitable incorporation of the modifier component into the polyphthalamide component.

Preferably, aliphatic radicals R in the above formula comprise at least one straight chain, branched or cyclic, substituted or unsubstituted aliphatic radical having from about 4 to about 14 carbon atoms. These radicals are preferred because polyphthalamides comprising the same exhibit good crystallinity and desirable high temperature properties, together with melting and thermal degradation temperatures making them well suited for melt processing with the modifying components of the invented compositions. Specific examples of suitable aliphatic radicals include tetramethylene, hexamethylene, dodecamethylene and the like, as well as their alkyl-substituted analogs such as 2-methylpentamethylene, 2,4-dimethylhexamethylene and the like, and cyclic analogs such as p-cyclohexyl and the like. Most preferably, R in the formula comprises a hexamethylene radical, either alone or as mixture with additional aliphatic 4 to 14 carbon atom radicals.

The polyphthalamide component has a melting point of at least about 270° C. as a result of its high content of terephthalamide units. Preferred polyphthalamide components are those melting at about 290° C. to about 330° C. because the same exhibit particularly desirable thermal properties and are more easily processed than higher melting polyphthalamides.

The polyphthalamide component of the invented compositions also can comprise a portion of recurring units as described above but wherein radicals R are replaced with one or more other types of divalent hydrocarbyl radicals, e.g. substituted or unsubstituted aromatic radicals. Specific examples of such other radicals include m-phenylene, p-phenylene, m-xylylene, p-xylylene, oxybis-phenylene and methylenebis-phenylene. When such other radicals are present, the proportion thereof should not be so great as to adversely affect deskable properties of the polyphthalamide component, such as strength, thermal properties and melt processability. Preferably, not greater than about 30 mole percent of the recurring units of the polyphthalamide comprises such other radicals.

The polyphthalamide may further comprise, in addition to the terephthalamide units represented by the formula above, one or more other carbonamide units including aliphatic diamide units such as, for example, hexamethylene adipamide, hexamethylene sebacamide, hexamethylene azeleamide, hexamethylene dodecamethylamide, hexamethylene cyclohexanedicarboxylamide, dodecamethylene adipamide, and units derived from lactams such as caprolactam; aromatic diamide units such as m-xylylene isophthalamide, p-xylylene isophthalamide, oxybisphenylene isophthalamide or the like; and aliphatic-aromatic diamide units such as, for example, hexamethylene isophthalamide, hexamethylene 2,6-naphthalene dicarboxylamide, m-xylylene adipamide, heptamethylene isophthalamide, dodecamethylene isophthalamide, m-phenylene adipamide or the like. Preferred among such additional carbonamide units are hexamethylene adipamide, hexamethylene isophthalamide and caprolactam units and combinations thereof.

Proportions of such other carbonamide units in the polyphthalamide compositions should not be such as to adversely affect processability or desirable properties of the invented compositions. Generally, at least about 50 mole percent of the carbonamide moieties of the polyamide composition is provided by aliphatic diamine terephthalamide units corresponding to the formula above to assure crystallinity and desirable strength and thermal properties. More preferably, about 55 to about 90 mole % of such moieties are provided by such units to achieve good properties and ensure melt processing compatibility of the polyphthalamide component and the modifying component.

A preferred polyphthalamide component of the invented compositions comprises a semicrystalline polyphthalamide of fast or intermediate crystallization rate comprising recurring units corresponding to formulas A, B and C below in proportions of about 50 to about 95 mole percent A, 0 to about 35 mole percent B and about 5 to about 50 mole percent C.

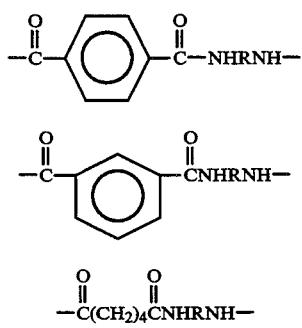

In the above formulas, R is as described hereinabove, with hexamethylene being most preferred. Also as described above, R may represent a mixture of aliphatic 4 to 14 carbon radicals.

Particularly preferred among such polyphthalamides are those wherein the mole ratio of the units A, B and C ranges from about 65-95:25-0:35-5 because such compositions exhibit excellent thermal and mechanical properties. Such polyphthalamides have melting points of about 300° to about 350° C., glass transition temperatures ("$T_g$s") of about 90° to about 130° C. and inherent viscosities generally ranging from about 0.75 to about 1.4 dl/g, with about 0.9 to about 1.25 dl/g being preferred from the standpoint of properties of molded parts and ease of molding. Such polyphthalamides are disclosed in detail in commonly assigned U.S. Pat. No. 4,603,166 to Poppe et al., issued Jul. 29, 1986, now U.S. Pat. No. Re. 34,447 which is incorporated herein by reference. Especially preferred among such polyphthalamides are those wherein R in the above formulas comprises hexamethylene. Most preferred among such polyphthalamides are those wherein R in formulas A, B and C consists of hexamethylene and the mole ratio of the A, B and C units is about 65:25:10.

Also disclosed in U.S. Pat. No. Re. 34,447 and suitable as the polyphthalamide component of the invented compositions are polyphthalamides comprising at least two of the units A, B and C shown above, in mole ratios of 65:35:0, 55:35:10, 60:30:10, 50:0:50 and 60:0:40, and wherein R is hexamethylene.

Polyphthalamides comprising recurring units A, B and C, as depicted in the formulas above, in mole ratios of about 50–65:0–15:20–50, also are suitable. A specific example of a polyphthalamide having such a composition, disclosed in Table 10 of published European Patent Application No. 84300744.4 (Publication No. 0121984), published Oct. 17, 1984, is a polyphthalamide of terephthalic acid, isophthalic acid and adipic acid in a mole ratio of 55/15/30 with hexamethylene diamine. Among such polyphthalamides, those wherein the mole ratio of the A, B and C units is greater than 50 but less than 60:greater than 0 to less than 15:at least 25 but less than 50, and especially wherein R comprises hexamethylene, give particularly good results. Mechanical properties, including tensile and flexural strength and modulus, of such polyphthalamides together with their melt processability and low water absorption tendencies and good retention of mechanical properties when wet, make compositions according to this invention comprising such polyphthalamides particularly well-suited for fabrication of injection molded articles for use in humid environments. Melting points of such compositions range from about 290° to about 320° C.

Another example of a polyphthalamide component of the invented compositions is that prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Such polyphthalamides are described in detail in commonly assigned U.S. Pat. No. 4,617,342 to Poppe et al., issued Oct. 14, 1986, which is incorporated herein by reference. Such polyphthalamides melt at about 270° to about 345° C.

Also suitable for use in the invented compositions are polyphthalamides based on terephthalic acid and isophthalic acid compounds in a mole ratio of about 70–99:30–1 and hexamethylene diamine. These polyphthalamides are described in detail in commonly assigned U.S. Pat. No. 4,863,991 issued Sep. 5, 1989 to Poppe et al., which is incorporated herein by reference. Melting points range from about 310° to about 350° C.

The polyphthalamide component of the invented compositions can be prepared from appropriate starting materials, e.g., a dicarboxylic acid component comprising terephthalic acid or a derivative thereof and a diamine component comprising at least one aliphatic diamine or a derivative thereof, in suitable proportions by any suitable means. If desired, the acid component can comprise terephthalic acid compound and one or more additional dicarboxylic acids or derivatives thereof to provide copolyamides as described above. Similarly, mixtures of diamines can be used and lactams can be included in the starting materials if desired. An example of a suitable method for preparing the polyphthalamide component is disclosed in the aforementioned U.S. Pat. No. Re. 34,447 and involves a salt preparation step, preferably conducted batchwise to achieve proper stoichiometry, wherein starting materials comprising dicarboxylic acid and diamine components and solvent are added to a suitable reaction vessel in appropriate amounts and maintained under conditions effective to cause salt formation but avoid appreciable conversion of salt to oligomers. Water is a preferred solvent and temperature is preferably maintained below about 120° C. to minimize conversion. Product of the salt preparation step can be introduced into a condensation section operated either batchwise or continuously. In the condensation section substantial conversion of salt to polymer takes place. The condensation product then typically is introduced into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like.

Commonly assigned U.S. Pat. Nos. 4,603,193, issued Jul. 29, 1986, and 4,831,108, issued May 16, 1989, both to Richardson et al. and incorporated herein by reference, also disclose preparation of such polyphthalamides by a process particularly suited for high terephthalamide content polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at short residence time and passing the resulting product to a finishing reactor to increase conversion thereof.

Copolyamides comprising at least about 50 mole percent recurring terephthalamide units together with one or more other types of recurring carbonamide units also can be prepared by blending appropriate homopolyamides or copolyamides in suitable amounts. For example, melt compounding a hexamethylene terephthalamide/hexamethylene isophthalamide copolyamide with nylon 66 can yield a hexamethylene terephthalamide/isophthalamide/adipamide terpolyamide. Melt compounding at temperatures above the melting point of the highest melting component in a suitable extruder is preferably employed in such preparation.

The functionalized polyolefin component of the blend may be a polyethylene, a polypropylene, an ethylene-higher alpha-olefin polymer or an ethylene-higher alpha-olefin-diene polymer, and will be provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Examples of suitable higher alpha-olefins include propylene, butene-1 and hexene-1, with propylene being preferred. Suitable dienes are nonconjugated dienes having 4 to about 24 carbon atoms, examples of which include 1,4-hexadiene, dicyclopentadiene and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene copolymers having about 70 to about 95 mole percent ethylene units and about 5 to about 30 mole percent propylene units are preferred among these. In terpolymers comprising polymerized diene monomer, the diene unit content can range up to about 10 mole percent with about 1 to about 5 mole percent being preferred. The functionalized polyolefins will generally comprise about 0.1 to about 10 weight percent functional groups. Specific examples of suitable functionalized polyolefins include a maleic anhydride-functionalized ethylene-propylene copolymer rubber comprising about 1 weight percent pendant succinic anhydride groups, identified as Exxelor® VA 1801 from Exxon Chemical Company; alpha-olefin-carboxylic acid copolymers containing at least about 2 mole percent carboxylic acid units such as an ethylene-acrylic acid copolymer containing 9.5 wt % acrylic acid units obtained as Primacor® 1410 from Dow Chemical Company; thermoplastic ionomer resins comprising an ethylene-carboxylic acid copolymer neutralized wholly or partially with metal cations such as zinc, sodium or lithium such as an ethylene-methacrylic acid thermoplastic ionomer resin, obtained in the zinc-neutralized form as Surlyn® 9020 from DuPont Chemical Company; and a maleated propylene polymer having 0.4 wt % carboxyl functionality (published value) as pendant succinic anhydride groups, obtained as Exxelor PO 1015 from Exxon Chemical Company.

The functionalized block copolymer synergist of the invented compositions comprises a maleic anhydride-modified, block copolymer comprising polymerized styrene blocks and rubber blocks comprising ethylene/propylene, ethylene/butylene or ethylene/pentylene polymer blocks or a combination thereof. Polymerized styrene content of the modified block copolymer preferably is about 5 to about 50 weight percent because the same provides desirable improvements in toughness in the invented compositions. Best results are achieved when polymerized styrene content is about 10 to about 35 weight percent.

The rubber blocks of the modified block copolymer comprise ethylene/propylene, ethylene/butylene or ethylene/pentylene polymer blocks or combinations thereof. Proportions of ethylene and propylene, butylene or pentylene units in these blocks can vary widely. Such blocks can contain minor amounts of unsaturation in the ethylene, propylene, butylene or pentylene groups. Preferably, unsaturation content is about 15 percent or less because higher levels can lead to inadequate thermal stability of the functionalized block copolymers.

The functionalized block copolymer generally comprises up to about 10 weight percent pendant succinic anhydride groups, with about 0.5 to about 5 weight percent being preferred because lower levels may lead to inadequate incorporation of the modifying component into the polyphthalamide component while greater levels do not provide appreciable benefits over those achieved at about 5 weight percent. These groups are bonded predominantly to one or more of the secondary or tertiary carbons of the propylene, butylene or pentylene groups or to benzylic carbons of the styrene groups.

Preferably, the block copolymer is a hydrogenated styrene-1,3-butadiene or -isoprene block copolymer with residual unsaturation of up to about 10% of its original unsaturation content because higher levels can result in decreased thermal stability and loss of toughening effect as a result of preparation and processing of the invented compositions. In such hydrogenated styrene-butadiene block copolymers, the rubber blocks comprise ethylene/butylene polymer blocks with proportions of ethylene and butylene units varying depending on the relative levels of 1,2 and 1,4 addition of the diene in the unhydrogenated copolymer. It also is preferred that the pendant succinic anhydride groups result from reaction of such a hydrogenated block copolymer with maleic anhydride.

A specific example of a preferred functionalized block copolymer according to the present invention is a styrene-ethylene/butylene-styrene block copolymer with pendant succinic anhydride groups identified as Kraton ® FG 1901X rubber from Shell Chemical Company. The material also can also be described as a maleic anhydride-grafted, hydrogenated styrene-butadiene block copolymer. This product contains about 29 weight percent polymerized styrene, about 2 weight percent pendant succinic anhydride groups and has a glass transition temperature of its hydrogenated, polymerized butadiene block of about −42° C. Onset of thermal degradation of this material occurs between about 270° C. and about 315° C., as determined by Thermal Gravimetric Analysis, and the manufacturer's literature (MSDS 2,898-1, dated Jun. 22, 1987) states that in processing, temperature should not be allowed to exceed 550° F. (287° C.).

The functionalized block copolymer can be prepared by any suitable technique. One such method is as disclosed in the previously discussed published European Patent Application No. 0211467 of Gelles et al., which is incorporated herein by reference. As disclosed therein, styrene-butadiene block copolymers having about 7 to about 100 percent 1,2-microstructure are prepared by polymerization of styrene and 1,3-butadiene with sequential or incremental addition of monomers or by coupling techniques. The monomers preferably are utilized so as to provide about 10 to about 50, and more preferably, about 10 to about 35 weight percent polymerized styrene in the block copolymer. Hydrogenation of such copolymers can be conducted by known techniques, for example by hydrogenation of the block copolymer dissolved in a hydrocarbon solvent, such as cyclohexane, in the presence of Raney nickel, noble metal or soluble transition metal catalysts. The hydrogenation is conducted substantially to eliminate residual unsaturation in the diene block of the block copolymer although a small amount of residual unsaturation, e.g. up to about 10 percent of the original unsaturation content, may remain in the hydrogenated product. The hydrogenated product, comprising styrene and ethylene/butylene blocks, then is grafted to provide about 0.5 to about 5 weight percent pendant succinic anhydride groups by reaction with maleic anhydride. Preferably, this reaction is conducted using a free radical initiator. The grafting reaction can be conducted in solution or in the melt. Similar techniques can be utilized for preparation and hydrogenation of styrene-isoprene or styrene-butadiene-isoprene co- or terpolymers and grafting of the hydrogenated polymers. Another suitable method, wherein pendant succinic anhydride groups are bonded predominantly to benzylic carbons of styrene units of the block copolymer, is that disclosed in the aforementioned U.S. Pat. No. 4,783,503 to Gergen et al. which is incorporated herein by reference.

The invented blends will comprise at least about 50 parts by weight polyphthalamide component and up to about 50 parts, preferably from about 5 to about 50 parts by weight of the modifier components, that is, the combination of the functionalized polyolefin and functionalized block copolymer synergist, based on a total of 100 parts by weight of the three blend components. The blends may be described the alternative as comprising from 50 to 95 wt % of the polyphthalamide component and from about 50 to about 5 wt % of the aforesaid modifier component. The relative amounts of the modifier components will be selected to achieve a desirable combination of impact, strength, processability and stiffness properties at reduced cost. Generally, the amount of functionalized block copolymer synergist employed will be selected to be lowest quantity necessary to provide the desired synergistic improvement impact properties, and will generally lie in the range of from about 2.5 to about 10 wt % of the blend. Although greater quantities of the functionalized block copolymer may be employed, little if any further improvement in impact will be realized, and the goal of minimizing costs will thus be defeated by use of such higher levels.

For maximum impact strength with a desirable combination of high tensile strength and flexural modulus, preferred proportions are about 70 to about 85 wt % polyphthalamide component, about 10 to about 30 wt % functionalized polyolefins and about 2.5 to about 10 wt % functionalized block copolymer, based on the total of the three components. Such compositions typically exhibit Notched Izod impact strengths of at least about 10 ft-lb/inch notch to as great as 18 ft-lb/inch notch and greater.

The blends of the present invention may be further compounded to include up to 200 pbw, per 100 pbw of the blend, of various additives to improve or modify various chemical and physical properties. Examples of such additives include flame retardants, stabilizers, antioxidants, processing aids, colorants, fillers and reinforcing agents. Examples of suitable stabilizers include various metal halide and carboxylate salts, such as cuprous iodide and cupric acetate; alkali metal halides, such as potassium iodide; and combinations thereof. Ethylene-bis-stearamide and hexamethylene-bis-stearamide are examples of amide lubricants. Representative fibers suitable as reinforcing agents include glass fibers, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool and wood cellulose fibers, etc. Representative filler materials include calcium silicate, silica, clays, talc, mica, carbon black, titanium dioxide, wollastonite, polytetrafluoroethylene, graphite, alumina trihydrate, sodium aluminum carbonate, barium ferrite, etc. The appropriate types and levels of such additives will depend on processing techniques and on the end use of the resultant product, and can be determined by those skilled in the art.

Other thermoplastic compositions also can be blended with the invented compositions if desired. Such polymers should be capable of withstanding temperatures employed in preparation and processing of the compositions. Examples include polar resins, such as polyesters, polycarbonates and polyarylethers, as well as nonpolar resins such as polyalphaolefins. Examples of suitable polyalphaolefins include polyethylenes (high, low and linear low density), polypropylene, poly-1-butene and poly-4-methyl-1-pentene. Both filled and unfilled compositions comprising the blends of this invention in combination with polyolefins such as polypropylene provide particularly attractive and readily processable resin formulations.

The compositions according to this invention can be prepared by any suitable means. Conveniently, components comprising the polyphthalamide and modifying components, in powder, pellet or other suitable form, are melt compounded at temperatures effective to render the resinous components molten, in a high shear mixer, e.g., a twin-screw extruder, to obtain a desirably uniform blend. When using a modifier component comprising the maleic anhydride-grafted block copolymer and one or more additional rubbery polymers, the modified block copolymer and additional rubber can be added separately or in combination to the polyphthalamide component. Kneading blocks or other suitable mixing elements can be employed to facilitate mixing. To minimize degradation of the invented compositions and the polyphthalamide and modifying components, preferred temperatures when using a twin-screw mixer are equal to or up to about 20° C. greater than the melting point of the polyphthalamide component. Screw speed and temperature should be selected so as to achieve good mixing of components of the invented compositions without exceeding a melt temperature of about 360° C., at which properties of the final compositions may be sacrificed as a result of degradation. Combining the components in solid form, such as powder or pellets, prior to melt compounding can be conducted to facilitate the latter. Particulates, fibers and other additives can be incorporated into one or more of the components prior to combining them or into the compositions by physical mixing with the same in powder or pellet form and then extrusion compounding the result, by feeding the additives, particulates or fibers to the molten composition in an extruder or other compounding apparatus or by other suitable methods.

The invented compositions are particularly useful as unfilled and filled injection molding compounds for production of molded objects of high impact strength and ductility. Examples of such objects include lawn-mower housings, automobile radiator housings, power tool shrouds and automobile valve cover housings. Injection molding of such compositions generally is conducted using standard injection molding equipment. The invented compositions can also be formed into fibers, film, sheets or other forms by suitable techniques, e.g. melt spinning of fibers, extrusion of sheets or films, or used as matrix materials or binders for composite or laminated structures.

The present invention is described further in connection with the following examples, it being understood that the same are for purposes of illustration and not limitation.

POLYPHTHALAMIC PREPARATIONS

Polyphthalamides used in the following examples are described in Table I below and were prepared substantially as described below.

To a large, stainless steel, stirred reactor having an oil jacket heating system was added a 75 weight percent solution of hexamethylene diamine in water. The solution was diluted to about 44 weight percent diamine with deionized water and then adipic acid, isophthalic acid and terephthalic acid, in amounts corresponding substantially to the mole ratios reported in Table I below, were added. The mole ratio of diamine to total acids was about 1.05–1.1:1. About two mole percent benzoic acid, based on total moles of diacids, was added as a capping agent. Temperature increased during addition of the acids to about 70° C. Zinc hypophosphite catalyst (1000 parts per million calculated as hypophosphite ions) then was added to the reactor after which it was sealed, purged with nitrogen, leaving a 5.64 kg/cm$^2$ (80 psig) nitrogen blanket in the reactor, and then heated to about 120° C. and held at that temperature. A second such reactor was charged, purged and heated in like manner and the two reactors were used in parallel to provide continuous feed of salt solution to downstream processing by alternating between the two reactors.

Contents of the salt reactors were pumped continuously to a jacketed, oil-heated, stirred tank and maintained under pressure of 10.5 kg/cm$^2$ (150 psig) therein using a microprocessor-controlled Research Control Valve. The reactor was heated to about 220°C. Residence time in the reactor under such conditions was about 15 minutes, resulting in decrease in water content of the salt solution.

Contents of the tank were pumped continuously to and through two jacketed, oil heated, stainless steel pipes of 0.95 cm inner diameter and lengths of 274 and 401 cm in series at a rate of about 8.2 kg/hour using a dual headed Bran-Lubbe piston pump. The first pipe was maintained at about 315°–325° C. and the second at about 325°–335° C.; both were maintained under pressure of about 128 kg/cm$^2$ (1800 psig) using a microprocessor controlled Research Control Valve.

Contents of the second heated pipe were passed continuously through the Research Control Valve to a jacketed tube of about 0.94 cm inner diameter and about 274 cm length, equipped with thermocouples to monitor temperatures in the tube and between the outer wall of the tube and inner wall of the jacket, under pressure of about 7 kg/cm$^2$ (100 psig) with 325°–345° C. heat exchange fluid circulating in the heating jacket. Flashing of volatiles in the feed to the tube occurred in an upstream portion thereof.

Contents of the tube, comprising water vapor and molten polymer, were passed through another microprocessor-controlled Research Control Valve and introduced onto the screws of a Werner and Pfleiderer Corporation ZSK-30, twin-screw extruder. Volatiles were allowed to escape through a front vent in the extruder barrel, maintained under vacuum of 20 inches of mercury, and a rear vent in the barrel. Polymer was conveyed between screw flights with the screws rotating at 100 rpm and the extruder barrel heated at 300° to 330° C. Polymer was extruded through a water bath and then chopped into pellets.

Prior to use in the following examples, the polyphthalamides were dried for 16 hours at 110° C. under vacuum.

Compositions and properties of the polyphthalamides used in the following examples are shown in Table I wherein mole ratios of the hexamethylene terephthalamide, isophthalamide and adipamide units, if present, of such compositions appear under the heading "Mole Ratio (6T/6I/6A)".

TABLE I

| Polyphthalamide | Mole Ratio (6T/6I/6A) | IV* (dl/g) | Melting Point(°C.) |
|---|---|---|---|
| A | 65/25/10 | 1.0 | 300–310 |
| B | 60/15/25 | 0.95 | 301 |
| C | 65/35/0 | 1.05 | 302 |
| D | 50/50/0 | 0.97 | — |

In the following Examples 1–9, blends of polyphthalamides and functionalized block copolymer were prepared, molded and tested for comparison purposes.

The mechanical properties are summarized in Tables II and III.

EXAMPLE 1

Polyphthalamide A, 1816 grams, and 454 grams of a maleic anhydride-functionalized styrene-ethylene/butylene styrene block copolymer containing about 29 weight percent polymerized styrene and about 2 weight percent pendant succinic anhydride groups, identified as KRATON ® FG1901X Polymer from Shell Chemical Company, were tumbled in a five gallon jar for about five minutes. The dry blend then was fed to a ZSK-30 twin screw extruder and melt compounded using barrel temperature settings of about 400° F. in an initial zone, 600° F. in four intermediate zones and 580° F. in a final zone at a throughput rate of 30 pounds per hour and screw speed of 150 rpm under vacuum of 10 inches of mercury. The compounded melt was pelletized and the pellets then were dried at about 110° C. for about 16 hours under vacuum and molded into test specimens using an Arburg injection molding machine operated at barrel temperatures of 570° F. in a first zone, 590° F. in a second zone and 590° F. in a final zone. Mold temperature was 250° F. Test specimens were tested for Notched Izod impact strength following the procedure of ASTM D-256, yield tensile strength (hereinafter "YTS") and elongation at break (hereinafter "EB") following the procedure of ASTM D-638-1, flexural modulus (hereinafter "FM") following the procedure of ASTM D-790 and heat deflection temperature (hereinafter "HDT") at 264 psi following the procedure of ASTM D-648. In all tests, five specimens were tested. Results are reported in Table II.

EXAMPLES 2-6

The procedure of Example I was repeated using different proportions of Polyphthalamide A and the modified block copolymer. In Examples 2 and 3, screw speed was 230 rpm and in Example 2A, screw speed was 300 rpm. Results are reported in Table II. Polyphthalamide A in Examples 1 and 6 was from the same lot and that in Examples 2-5 was from another lot; properties of the polyphthalamides are reported in the table as Control 1 and Control 2, respectively, for comparison.

TABLE II

| Comparison Blends: Polyphthalamide A and Functionalized Block Copolymer | | | | | |
|---|---|---|---|---|---|
| Example (Polyphthalamide/ Modifier, pbw) | Notched Izod (ft.lb/in) | YTS (kpsi) | EB (%) | FM (kpsi) | HDT (°F.) |
| 1 (80/20) | 18.9 | 10.6 | 32 | 342 | — |
| 2 (75/25) | 14.0 | 9.5 | 40 | 294 | 234 |
| 2A (75/25) | 11.4 | 10.0 | 25 | — | 245 |
| 3 (85/15) | 16.3 | 11.7 | 23 | 307 | 236 |
| 4 (90/10) | 11.6 | 14.2 | 18 | 478 | 248 |
| 5 (95/5) | 2.6 | 15.8 | 15 | 491 | 248 |
| 6 (98/2) | 1.7 | 16.4 | 12 | 493 | — |
| Control 1 (100/0) | 0.7 | 15.6* | 5.3 | 517 | 248 |
| Control 2 (100/0) | 1.0 | 14.4* | 4.4 | 529 | 253 |

*Samples did not yield, reported values are break tensile strengths.

As can be seen from Examples 1-6 and Table II, dramatic increases in Notched Izod impact strengths and elongations are achieved with from 15-25 wt. % functionalized block copolymer. While low levels of the modifying component, Examples 5 and 6, gave some increase in Notched Izod impact strength relative to the controls, significant improvement is not realized at levels below about 10 wt %.

EXAMPLES 7-9

Following generally the procedure of Example 1, test specimens were prepared from 80 parts by weight of Polyphthalamides B-D and 20 parts by weight of the functionalized block copolymer used in Examples 1-6. The composition in Example 7 also included 0.2 parts by weight of an amide lubricant identified as Kemamide S221 from Witco. Compounding was conducted using a ZSK-30 twin-screw extruder with barrel temperature profiles of about 350°-355° F., 445°-450° F., 515°-525° F., 520°-535° F., 600°-610° F., 595°-620° F., 595°-620° F., 575°-585° F. and at throughputs of 30-32 pounds per hour. Specimens were tested and results are reported in Table III; results also are reported for neat Polyphthalamides B, C and D as Controls 3, 4 and 5, respectively.

TABLE III

| Additional Comparison Blends | | | | | |
|---|---|---|---|---|---|
| Example (Polyphthalamide) | Notched Izod (ft.lb/in) | YTS (kpsi) | EB (%) | FM (kpsi) | HDT (°F.) |
| 7(B) | 18.3 | 10.5 | 34 | 324 | 227 |
| 8(C) | 6.8 | 12.2 | 28 | 343 | 258 |
| 9(D) | 17.2 | 9.1 | 63 | 265 | 234 |
| Control 3(B) | 0.7 | 13.7* | 4 | 476 | 219 |
| Control 4(C) | 1.8 | 19.0 | 16 | — | — |
| Control 5(D) | 2.2 | 14.1 | 57 | 431 | 235 |

Notes:
Polyphthalamide/functionalized block polymer ratio = 80/20.
*Samples did not yield; reported value is break tensile strength.

As in the previous examples, substantial increases in notched Izod impact strength with substantial retention of thermal and mechanical properties were achieved for blends at a level of 20 wt % functionalized block copolymer, Examples 7-9.

EXAMPLES 10-29

Following generally the procedure of Example 1, compositions were prepared from Polyphthalamide A, a variety of functionalized polyolefins and the functionalized block copolymer used in Examples 1-9. Additional comparison examples were also prepared using various rubbery impact modifiers in in place of the functionalized polyolefin component. The Polyphthalamide A used in these examples was from various lots; that in Examples 10, 15 and 17 was the same as in Examples 1 and 6 and that in Examples 14, 16, 19, 20, 22 and 25 was the same as in Examples 2-5. Test specimens were prepared and tested substantially as in Example 1.

Example 10: Polyphthalamide A (80 parts by weight), modified block copolymer as in Example 1 (13 parts by weight) and a styrene-ethylene/butylene-styrene block copolymer containing about 13 weight percent polymerized styrene units, identified as Kraton ® G1657MX Polymer from Shell Chemical Company (7 parts by weight);

Example 11: Components as in Example 10 were used in proportions of 80/18/2 parts by weight, together with 0.2 parts by weight of the lubricant used in Example 7;

Example 12: Components were as in Example 11 in proportions of 80/16/4/0.2 parts by weight;

Example 13: Components were as in Example 10 in proportions of 70/6/24 parts by weight;

Example 14: Components were as in Example 10, except that the additional rubber was a styrene-ethylene/butylene-styrene block copolymer containing about 32 weight percent polymerized styrene units, identified as Kraton® G1651 Polymer from Shell, in proportions of 80/5/15 parts by weight;

Example 15: Components were as in Example 10 in proportions of 80/7/13 parts by weight;

Example 16: Components were as in Example 14 in proportions of 80/13/ parts by weight;

Example 17: Components were as in Example 11 in proportions of 80/10/10/0.25 parts by weight;

Example 18: Polyphthalamide A (80 parts by weight), modified block copolymer as in Example 1 (17 parts by weight) and a zinc-neutralized, ethylene-methacrylic acid thermoplastic ionomer resin having a melt index of 1 g/10 minutes, identified as Surlyn® 9020 from DuPont (3 parts by weight);

Example 19: Components were as in Example 18 in proportions of 75/21.25/3.75 parts by weight;

Example 20: Components were as in Example 18 in proportions of 80/3/17 parts by weight;

Example 21: Components were as in Example 18 in proportions of 85/12.75/2.25 parts by weight;

Example 22: Polyphthalamide A (80 parts by weight), modified block copolymer as in Example 1 (4 parts by weight), ethylene-acrylic acid copolymer containing 9.5 wt. % acrylic acid units and having melt index of 1.5 g/10 min. identified as Primacor® 1410 from Dow (16 parts by weight) and the lubricant as in Example 7 (0.2 parts by weight);

Example 23: Components were as in Example 22 except no lubricant was included. Proportions were 75/21.2/3.8 parts by weight;

Example 24: Components were as in Example 22, except the additional rubber was an ethylene-acrylic acid copolymer identified as Primacor® 1410 XT from Dow, in proportions of 55/7.9/37.1/0.25 parts by weight;

Example 25: Components were as in Example 22 in proportions of 70/5.25/24.75/0.25 parts by weight;

Example 26: Components were as in Example 24 in proportions of 70/5.25/24.75/0.25 parts by weight;

Example 27: Components were as in Example 22 in proportions of 80/3.5/16.5/0.25 parts by weight;

Example 28: Polyphthalamide A (80 parts by weight), modified block copolymer as in Example 1 (5 parts by weight), maleic anhydride-functionalized ethylene-propylene copolymer rubber identified as Exxelor® VA 1801 from Exxon (15 parts by weight) and the lubricant as in Example 7 (0.25 parts by weight);

Example 29: Components were as in Example 28 in proportions of 80/10/10/0.25 parts by weight;

Example 30: Components were as in Example 28 in proportions of 80/15/5/0.25 parts by weight.

TABLE IV

| Example | Izod impact (ft-lb/in) | YTS (kpsi) | EB (%) | FM (kpsi) | HDT (°F.) |
|---|---|---|---|---|---|
| 10 (compar.) | 18.9 | 11.1 | 28 | 353 | — |
| 11 (compar.) | 18.6 | 11.3 | 31 | 340 | 238 |
| 12 (compar.) | 19.1 | 11.2 | 31 | 345 | 240 |
| 13 (compar.) | 1.5 | 1.0 | 32 | 11 | 234 |
| 14 (compar.) | 2.5 | 10.8 | 10 | 327 | 241 |
| 15 (compar.) | 8.3 | 9.5 | 6 | 314 | — |

TABLE IV-continued

| Example | Izod impact (ft-lb/in) | YTS (kpsi) | EB (%) | FM (kpsi) | HDT (°F.) |
|---|---|---|---|---|---|
| 16 (compar.) | 12.5 | 10.8 | 22 | 346 | 237 |
| 17 (compar.) | 17.6 | 11.4 | 29 | 353 | 239 |
| 18 | 17.3 | 10.7 | 27 | 333 | 235 |
| 19 | 14.6 | 10.2 | 27 | 337 | 237 |
| 20 | 16.0 | 10.8 | 21 | 342 | 242 |
| 21 | 9.9 | 12.0 | 16 | 367 | 244 |
| 22 | 18.3 | 10.3 | 32 | 310 | 236 |
| 23 | 11.5 | 9.9 | 29 | 313 | 240 |
| 24 | 12.9 | 6.1 | 72 | 126 | 181 |
| 25 | 17.5 | 8.0 | 64 | — | 233 |
| 26 | 5.6 | 8.9 | 43 | 253 | 232 |
| 27 | 19.7 | 10.6 | 47 | 303 | 239 |
| 28 | 18.6 | 10.1 | 34 | 344 | 242 |
| 29 | 18.5 | 10.1 | 32 | 317 | 253 |
| 30 | 19.6 | 10.3 | 35 | 322 | 246 |

Control examples were prepared as follows from Polyphthalamide A and various of the additional rubbery polymers used in Examples 10–30 or various other rubbery polymers and test specimens were molded and tested. Test results are summarized in Table V.

CONTROLS 6–21

Control 6: Polyphthalamide A (70 parts by weight) and an acrylonitrile-butadiene-styrene polymer, identified as Cycolac L from Borg-Warner (30 parts by weight) were melt compounded using a ¾-inch Brabender single screw extruder at a barrel temperature profile of 275° C./280° C./275° C./275° C. and screw speed of 100 rpm.

Control 7: Polypthalamide A (70 parts by weight) and a maleic anhydride-functionalized acrylonitrile-butadiene-styrene polymer (30 parts by weight), prepared by combining 326 grams of the acrylonitrile-butadiene-styrene polymer used in Control 6 with 3.2 grams maleic anhydride and 0.32 grams dicumyl peroxide dissolved in 100 ml of acetone/hexane (20/80 vol/vol), stirring for about one hour, removing the solvent by evaporation and drying under vacuum at about 50° C., were melt compounded as in Control 6 but at a barrel temperature profile of 290° C./290° C./290° C./290° C. and screw speed of 110 rpm.

Control 8: Polypthalamide A (70 parts by weight), ethylene-propylene-diene rubber, identified as Vistalon 3708 from Exxon (29.5 parts by weight) and citric acid (0.5 parts by weight) were melt compounded as in Control 6 but at a barrel temperature profile of 285° C./295° C./295° C./295° C. and screw speed of 70 rpm.

Control 9(a)–(c): Polyphthalamide A (70 parts by weight) and maleic anhydride-functionalized ethylene-propylene-diene rubber (30 parts by weight), prepared by combining 500 grams of an ethylene-propylene-diene rubber identified as Nordel 1500 from DuPont and 10.2 grams maleic anhydride and extruding the mixture in a Brabender ¾-inch single screw extruder at a temperature of about 240° C., were melt compounded as in Control 6 but at barrel temperature profiles of 280°–285° C./290°–295° C./290°–295° C. and screw speeds of 60–90 rpm.

Control 10: Polyphthalamide A (80 parts by weight) and maleic anhydride-functionalized ethylene-propylene copolymer rubber as in Examples 28–30 (20 parts by weight) were melt compounded essentially as in Example 1 but at a barrel temperature profile of 351 ° F./450° F./534° F./562° F./605° F./605° F/605° F./582° F. and screw speed of 150 rpm.

Control 11: Components as in Control 10, together with the lubricant used in Example 7, in proportions of 92.5/7.5/0.25 parts by weight, were melt compounded using a ZSK-30 twin screw extruder following generally the procedure of Example 1.

Control 12: Polyphthalamide A (75 parts by weight) and an ethylene-vinyl acetate-glycidal methacrylate terpolymer identified as Igetabond B from Sumitomo Chemical Co., Ltd., (25 parts by weight) were melt compounded using a ZSK-30 twin screw extruder following generally the procedure of Example 1.

Control 13: Polyphthalamide A (92.5 parts by weight), an ethylene-methacrylic acid-butyl acrylate terpolymer containing 20% methacrylic acid units and having a melt index of 11 g/10 min., identified as Nucrel 010 from DuPont (7.5 parts by weight), and the lubricant used in Example 7 (0.25 parts by weight) were melt compounded using a ZSK30 twin screw extruder following generally the procedure of Example 1.

Control 14: Polyphthalamide A (70 parts by weight) and the ethylene-acrylic acid copolymer as in Example 22 (30 parts by weight) were melt compounded using a ZSK-30 twin screw extruder following generally the procedure of Example 1.

Control 15: Components as in Control 14, in proportions of 85/15 parts by weight, were melt compounded using a ZSK-30 twin screw extruder following generally the procedure of Example 1.

Control 16: Components as in Control 14, in proportions of 90/10 parts by weight, were melt compounded using a ZSK-30 twin screw extruder following generally the procedure of Example 1.

Control 17: Components as in Control 14, in proportions of 95/5 parts by weight, were melt compounded using a ZSK-30 twin screw extruder following generally the procedure of Example 1.

Control 18: Polyphthalamide A (80 parts by weight) and a maleic anhydride-functionalized low-density polyethylene (20 parts by weight), prepared by combining 2964 grams low density polyethylene, identified as Dow 123, 30 grams maleic anhydride and 6 grams dicumyl peroxide and extruding the mixture in a Brabender ¾-inch single screw extruder at a temperature of about 230° C., were melt compounded as in Control 6 but at a barrel temperature profile of 275° C./290° C./290° C./290° C. and screw speed of 75 rpm.

Control 19: Polyphthalamide A (60 parts by weight) and the zinc-neutralized ethylene-methacrylic acid copolymer as in Example 18 (40 parts by weight) were melt compounded as in Control 6 but at a barrel temperature profile of 270° C./290° C./290° C./290° C. and screw speed of 70 rpm.

Control 20(a)–(f): Components were as in Control 19 in proportions of 70/30 parts by weight. Compounding procedures in Controls 20(a) and (d) followed generally the procedure of Example 1. In Control 20(b), a ¾-inch Brabender single screw extruder was used with barrel temperature settings of 285° C./300° C./300° C./295° C. and screw speed of 60 rpm. In Control 20(c) an 80/20 parts by weight composition was prepared using the Brabender extruder with barrel temperature settings of 285° C./290° C./290° C./290° C. and screw speed of 80 rpm and then additional amounts of the components were added to the result to achieve a 70/30 parts by weight composition which then was compounded using the Brabender extruder with barrel temperature settings of 285° C./290° C./290° C./290° C. and screw speed of about 65 rpm. In Control 20(e) a large twin screw extruder was used with barrel temperature settings ranging from about 212° C. at the feed end to about 325° C. at the exit zone, screw speed of 150 rpm and with about 58 weight percent of the rubbery polymer fed with polyphthalamide A through the feed port and the remainder of the rubbery polymer fed downstream using a vent stuffer.

Control 21(a)–(c): Components were as in Control 19 in proportions of 80/20 parts by weight. Compounding in Control 21(a) employed a ¾-inch Brabender single screw extruder with barrel temperature settings of 290° C./325° C./325° C./285° C. and screw speed of 50 rpm. Compounding in Controls 21(b) and (c) followed generally the procedure of Example 1.

TABLE V

| Control Example | Izod impact (ft-lb/in) | YTS (kpsi) | EB (%) | HDT (°F.) |
|---|---|---|---|---|
| C6 | 1.3 | — | 6 | 238 |
| C7 | 1.4 | — | 3 | 223 |
| C8 | 1.0 | — | — | 232 |
| C9(a) | 12.6 | 8.9 | 33 | 231 |
| C9(b) | 2.4 | 8.5 | 17 | 234 |
| C9(c) | 2.3 | 8.4 | 18 | 239 |
| C10 | 17.6 | 9.2 | 33 | 238 |
| C11 | 2.6 | 13.0 | 14 | 244 |
| C12 | 1.8 | 8.4 | 35 | 210 |
| C13 | 2.1 | 14.2 | 15 | 250 |
| C14 | 4.5 | 9.0 | 57 | 221 |
| C15 | 3.6 | 12.0 | 20 | — |
| C16 | 3.1 | 14.4 | 20 | 241 |
| C17 | 1.7 | 15.2 | 15 | 244 |
| C18 | 4.6 | 12.1 | 25 | 240 |
| C19 | 22.4 | 7.9 | 70 | — |
| C20(a) | 11.1 | 9.8 | 27 | 239 |
| C20(b) | 8.7 | 9.7 | 28 | 240 |
| C20(c) | 22.2 | 9.6 | 40 | 240 |
| C20(d) | 18.3 | 10.1 | 41 | 238 |
| C20(e) | 17.4 | 10.2 | 49 | 240 |
| C20(f) | 4.3 | 10.0 | 20 | 242 |
| C21(a) | 4.3 | 11.4 | 25 | 248 |
| C21(b) | 15.4 | 11.7 | 23 | 248 |
| C21(c) | 12.5 | 12.2 | 32 | 237 |

The impact properties of blends of polyphthalamide, functionalized polyolefin and functionalized block copolymer according to the invention are summarized in the following Tables VIA and VIB, together with appropriate comparison and control blends.

TABLE VI A

| Example No.: | 22 | 27 | 25 | 23 | 5 | C17 | C16 | C15 | C14 |
|---|---|---|---|---|---|---|---|---|---|
| Pphthalamide-A pbw | 80 | 80 | 70 | 75 | 95 | 95 | 90 | 85 | 70 |
| Primacor 1410 pbw | 16 | 16.5 | 24.75 | 3.8 | — | 5 | 10 | 15 | 30 |
| Kraton FG pbw | 4 | 3.5 | 5.25 | 21.2 | 5 | — | — | — | — |
| Izod impact ft-lb/in notch | 18.3 | 19.7 | 17.5 | 11.5 | 2.6 | 1.7 | 3.1 | 3.6 | 4.5 |

It will be seen that the blends of Polyphthalamide, Primacor 1410 functionalized polyolefin and Kraton FG functionalized block copolymer having low levels of the Kraton FG component, Examples 22, 27 and 25, exhibit surprising improvement over the corresponding formulations with Primacor 1410 alone, examples C17, C16, C15 and C14. Moreover, the low levels of Kraton FG alone to not provide high impact, as shown by Example 5, provided for comparison purposes.

A further demonstration is provided by comparing the following Examples of blends of polyphthalamide, Surlyn 9020 functionalized polyolefin and functionalized block copolymer.

TABLE VIB

| Example No.: | 20 | C21 | 18 |
|---|---|---|---|
| Pphthalamide-A pbw | 80 | 80 | 80 |
| Surlyn 9020 pbw | 17 | 20 | 3 |
| Kraton FG pbw | 3 | — | 17 |
| Izod ft-lb/in notch | 16.0 | 12.5 | 17.3 |

Again, the addition of a minor amount of Kraton FG functionalized block copolymer to the blend of Polyamide and Surlyn 9020 functionalized polyolefin, Example 20, provides a substantial improvement in impact properties over the blends of polyphthalamide and Surlyn 9020 alone, Examples C21, C20 and C19. As with the Primacor 1410 blends in Table VIA, high levels of Kraton FG, Example 18, do not appear to provide significant further improvement.

Blends comprising other impact modifiers without functionality, for example, the Kraton G hydrogenated styrene-butadiene-styrene block copolymer impact modifiers of the prior an are not synergistically improved in impact by the addition of small amounts of functionalized block copolymer, as shown in the following Table VIC.

TABLE VI C

| Example No.: | 14 | 15 | 13 |
|---|---|---|---|
| Pphthalamide-A pbw | 80 | 80 | 70 |
| Kraton G SBS1 pbw | 15 | 13 | — |
| Kraton G SBS2 pbw | — | — | 24 |
| Kraton FG pbw | 5 | 7 | 6 |
| Izod ft-lb/in notch | 2.5 | 8.3 | 1.5 |

Notes:
For compositions, components, see Description of Examples and text.

EXAMPLES 31–32

Following generally the procedure of Example 1, compositions were prepared from Polyphthalamide A, the modified styrene-ethylene/butylene-styrene copolymer used in Examples 1–30 and various additional components. Test specimens were prepared and tested as in Example 1 and results are reported in Table VI. The compositions prepared and tested in these examples were as follows:

Example 31: Polyphthalamide A (80 parts by weight), modified block copolymer as in Example 1 (15 parts by weight) and commercial polypropylene resin having a melt flow rate of about 4 g/10 min. from Amoco Chemical Company (5 parts by weight).

Example 32: Polyphthalamide A (80 parts by weight), modified block copolymer as in Example 1 (20 parts by weight) and polytetrafluoroethylene powder, identified as Polylube J14 from Custom Compounding, Inc. (0.1 part by weight).

TABLE VI

| Example | Notched IZOD (ft-lb/in) | YTS (kpsi) | EB (%) | FM (kpsi) | HDT (°F.) |
|---|---|---|---|---|---|
| 31 | 12.9 | 11.0 | 21 | 429 | — |
| 32 | 17.8 | 10.2 | 29 | 330 | 235 |

As can be seen from Example 32 and Table VI, properties of the polytetrafluroethylene-containing composition were essentially unchanged from those of Example 1 in which equal parts polyphthalamide and modified block copolymer components were present. The polytetrafluoroethylene used in Example 32 did provide improvements in injection moldability, however. Inclusion of 5 parts by weight polypropylene in Example 31 reduced Izod impact strength as compared to the composition of Example 3, containing 85 parts by weight Polyphthalamide A and 15 parts by weight modified block copolymer; however, flexural modulus of the polypropylene-containing composition was significantly increased.

COMPARATIVE NYLON 6,6 EXAMPLES

Blends comprising Nylon 6,6 functionalized polyolefin and functionalized block copolymer were prepared for comparison purposes and tested.

Comparative Example, Sample 1. Following generally the procedure of Example 1, except melt extrusion temperature was 578° F., throughput was 25 pounds per hour and screw speed was 300 rpm and injection molding was conducted at barrel zone temperatures of 430° F., 515° F. and 560° F. and a mold temperature of 200° F., a composition containing 80 parts by weight commercial nylon 6,6, identified as Zytel ® 101 from DuPont, and 20 parts by weight modified block copolymer as in Example 1 was prepared and molded into test specimens (Sample 1 ) and tested.

Comparative Example, Sample 2. Following essentially the same procedure, at screw speed of 125 rpm, throughput of 30 pounds per hour, barrel temperature profile of 355° F./444° F./521 ° F./526° F./532° F./534F./556° F./554° F. and under vacuum of 15 inches Hg. a second sample (Sample 2) was prepared from 80 parts by weight of the nylon 66, 3.5 parts by weight of the modified block copolymer, 16.5 parts by weight of the ethylene-acrylic acid copolymer used in Example 22 and 0.25 parts by weight of the lubricant used in Example 7 and the composition was molded and tested. Molding was at barrel temperature settings of 538° F./550° F./550° F. and mold temperature of 150° F.

Comparative Example, Sample 3. Tests also were performed on specimens (Sample 3) prepared from the nylon 66 resin. Results are reported in Table VII.

TABLE VIII

| Sample | composition | pbw | Notched IZOD (ft-lb/in) | YTS (kpsi) | EB (%) | FM (kpsi) | HDT (°F.) |
|---|---|---|---|---|---|---|---|
| 1 | nylon 6,6 | 80 | 9.8 | 8.1 | 28 | 293 | 144 |
|   | Kraton FG | 20 | | | | | |
| 2 | nylon 6,6 | 80 | 2.0 | 8.5 | 28 | — | 147 |
|   | Primacor 1410 | 16.5 | | | | | |
|   | Kraton FG | 3.5 | | | | | |
| 3 | nylon 6,6 | 100 | 0.8 | 13.3 | 26 | 467 | 193 |

As shown by the comparative examples set forth in Table VII, notched Izod impact strength of the Sample 1 blend is improved relative to the neat nylon 6,6 of Sample 3, though not nearly to the level of the impact modified polyphthalamide blends of this invention. However, the impact properties of the blend comprising the functionalized polyolefin and a low level of the functionalized block copolymer, Sample 2 are not significantly improved. Further, the thermal properties of the nylon 6,6 blends as represented by HDT are substantially reduced by the combination, while the polyphthalamide blends according to this invention retain greater than 90% of the thermal properties of the unmodified polyamide.

The better performance of the invented compositions is all the more impressive considering that preparation thereof and preparation of test specimens therefrom were conducted at temperatures exceeding nominal degradation temperature of the modified block copolymer while temperatures in the comparative example were below the nominal degradation temperature.

The invention will thus be seen to be a polyamide composition comprising a blend of a polyterephthalamide toughened by including a functionalized polyolefin and a pendant succinic anhydride-functionalized block copolymer synergist, the functionalized block copolymer comprising polymerized styrene blocks and rubber blocks comprising ethylene/propylene, ethylene/butylene or ethylene/pentylene polymer blocks, or combinations of such blocks. The polyamide component of the blend will comprise a polyphthalamide having at least 50 mole per cent recurring aliphatic terephthalamide units and the functionalized polyolefin will be a polyethylene or polypropylene, or copolymer of ethylene with an alpha-olefin, provided with reactive functionality by being grafted or copolymerized with suitable reactive carboxylic acids or their derivatives.

Preferred compositions will comprise from about 50 to about 95 wt %, more preferably from about 70 to about 95 wt % polyphthalamide component and from about 5 to about 50 wt % of the combined functionalized polyolefin and functionalized block copolymer. Generally, the functionalized block copolymer will comprise from about 2.5 to about 10 wt % of the blend. The blends may be further combined with up to an equal quantity of additional thermoplastics such as polypropylene or the like, and may be combined with additional components such as mineral filler or structural fiber, reinforcing particulate fillers, pigments, colorants, stabilizering additives, lubricants and the like as is conventionally practiced in the resin compounding art. Generally the total amounts of such additional components will not exceed a level of about 200 pbw per 100 pbw of the toughened blend.

The preferred polyphthalamide may be further described as a copolyterephthalamide comprising greater than 50 mole % terephthalamides of one or more acyclic or cycloaliphatic $C_4$-$C_{14}$ aliphatic diamines, and may optionally include up to about 50 mole % aliphatic or aromatic dicarboxylic diamide units of the aforesaid diamines. More preferred are copolyterephthalamides derived from mixtures of aliphatic diamines including straight and branched chain $C_4$-$C_{14}$ aliphatic diamines, as well as those derived from mixtures of terephthalic acid or derivative with up to 50 mole % other dicarboxylic acids or their derivatives. Particularly preferred are polyterephthalamides derived from hexamethylene diamine and at least one branched aliphatic alkylene diamine such as 2-methylpentamethylene diamine, 2,2,4-trimethylhexamethylene diamine, 2,4-dimethylhexamethylene diamine or the like; terephthalamides of such diamine mixtures with up to 50 mole % of additional dicarboxylic diamide components such as the corresponding adipamides or isophthalamides; and terpolymers comprising from about 50 to about 90 mole % hexamethylene terephthalamide, from about 50 to about 10 mole % hexamethylene adipamide, and from about 0 to about 30 mole % hexamethylene isophthalamide.

The invention may also be characterized as a method for improving the toughness of polyamides, particularly copolyterephthalamides having at least 50 mole per cent recurring aliphatic diamine terephthalamide units, the method comprising compounding the polyphthalamide with up to 50 wt %, preferably from about 5 to about 30 wt % functionalized polyolefin and from 2.5 to about 10 wt % of a pendant succinic anhydride-functionalized block copolymer polymerized styrene blocks and rubber blocks comprising ethylene/propylene, ethylene/butylene or ethylene/pentylene polymer blocks, or a combination of such blocks as a synergist, the proportions based on total resin components of the blend.

Although the invention has been described and illustrated by way of specific embodiments set forth herein, those skilled in the art will recognize that alternative modifiers and polyamides within the description of the invention are available or may be readily obtained and used. Still further modifications and variations will be readily apparent to those skilled in the resin formulating and composite fabricating art, and such variations and modifications will be included within the scope of the invention as defined by the appended claims.

We claim:

1. A blend comprising a polyphthalamide having at least about 50 mole percent recurring units represented by the formula:

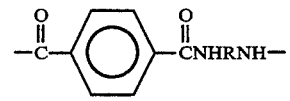

wherein R comprises at least one divalent aliphatic radical having from 4 to 14 carbon atoms, a functionalized polyolefin having as reactive functionality grafted or copolymerized carboxylic acid or derivative thereof and a pendant succinic anhydride-functionalized block copolymer said block copolymer comprising polymerized styrene blocks add rubber blocks comprising ethylene/propylene, ethylenic/butylene or ethylene/pentylene polymer blocks or a combination thereof.

2. The blend of claim 1 wherein the functionalized block copolymer comprises about 5 to about 50 weight percent polymerized styrene.

3. The blend of claim 1 wherein the functionalized block copolymer comprises a succinic anhydride-modified, hydrogenated block copolymer of styrene and 1,3-butadiene.

4. The blend of claim 1 comprising from about 50 to about 92.5 wt % polyphthalamide component, from about 5 to about 47.5 wt % of said functionalized polyolefin and from about 2.5 to about 10 wt % said block copolymer, based on the total weight of said components.

5. The blend of claim 1 wherein the polyphthalamide component further comprises up to 50 mole percent of at least one additional carbonamide unit selected from the group consisting of adipamide units, isophthalamide units and caprolactam units.

6. The blend of claim 1 wherein the functionalized polyolefin is a copolymer of at least one 1-olefin of 2 to about 10 carbon atoms and at least one alpha, beta-unsaturated carboxylic acid.

7. The blend of claim 6 wherein the functionalized polyolefin comprises an ethylene-acrylic acid copolymer.

8. A blend comprising (a) from about 50 to about 92.5 wt % of a polyphthalamide having from 50 to 100 mole % terephthalamide units represented by the formula:

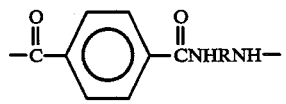

wherein R comprises at least one $C_4$–$C_{14}$ divalent aliphatic radical; and correspondingly, from 0 to about 50 mole % of at least one additional unit selected from the group consisting of adipamides, isophthalamides, and 2,6-naphthalene dicarboxylamides; dicarboxylamides; (b) from about 5 to about 47.5 wt % of a functionalized polyolefin having as reactive functionality grafted or copolymerized carboxylic acid or derivative thereof; and (c) from about 2.5 to about 10 wt % of a pendant succinic anhydride-functionalized block copolymer comprising polymerized styrene blocks and rubber blocks comprising ethylene/propylene, ethylene/butylene or ethylene/pentylene polymer blocks or a combination thereof and about 0.5 to about 5 wt % pendant succinic anhydride groups, the percentages of (a), (b) and (c) based on the total weight of said components.

9. The blend of claim 8 wherein the polyphthalamide component comprises recurring units:

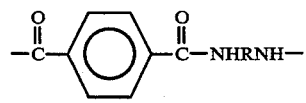   A

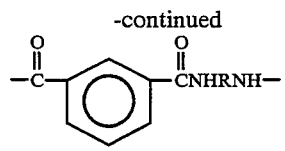   B

   C wherein R comprises at least one $C_4$–$C_{14}$ aliphatic radical and the mole ratio of the units A, B and C ranges from about 50–90:0–35:5–50.

10. A method for improving toughness of blends comprising (a) polyterephthalamide having at least 50 mole per cent recurring units represented by the formula:

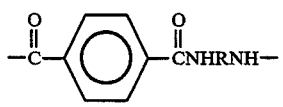

wherein R comprises at least one $C_4$–$C_{14}$ divalent aliphatic radical; and (b) functionalized polyolefins having as reactive functionality grafted or copolymerized carboxylic acid or derivative thereof, said method comprising compounding therewith from about 2.5 to about 10 wt %, based on total resin components, of a pendant succinic anhydride-functionalized block copolymer said copolymer comprising polymerized styrene blocks and rubber blocks comprising ethylene/propylene, ethylene/butylene or ethylene/pentylene polymer blocks, or a combination of such blocks.

11. The method of claim 10 wherein the functionalized block copolymer comprises about 5 to about 50 weight percent polymerized styrene.

12. The method of claim 10 wherein the functionalized block copolymer comprises a succinic anhydride-modified, hydrogenated block copolymer of styrene and 1,3-butadiene.

13. The method of claim 10 wherein the blend after compounding comprises from about 50 to about 92.5 wt % polyphthalamide component, from about 5 to about 47.5 wt % of said functionalized polyolefin and from about 2.5 to about 10 wt % said block copolymer, based on the total weight of said components.

* * * * *

UNITED STATES PATENT AND TRADEMARK OFFICE
CERTIFICATE OF CORRECTION

PATENT NO.: 5,387,645

DATED: February 7, 1995

INVENTOR(S): Ruth A. Montag, George A. Corbin

It is certified that error appears in the above-identified patent and that said Letters Patent is hereby corrected as shown below:

Patent reads:

| Col. | Line | |
|---|---|---|
| 6 | 55 | "deskable properties" should read --desirable properties-- |
| 12 | 63 | "untilled compositions" should read --unfilled compositions-- |
| 13 | 34 | "untilled and filled injection molding compounds" should read --unfilled and filled injection molding compounds-- |
| 13 | 51 | "POLYPHTHALAMIC PREPARATIONS" should read --POLYPHTHALAMIDE PREPARATIONS-- |
| 14 | 65 | underneath "Table I" the following omitted footnote should be included --*IV is inherent viscosity determined at 30°C on a 0.4 weight percent solution in a 60/40 weight/weight phenol/1,1,2,2-tetrachloroethane solvent mixture.-- |

UNITED STATES PATENT AND TRADEMARK OFFICE
CERTIFICATE OF CORRECTION

PATENT NO.: 5,387,645
DATED: February 7, 1995
INVENTOR(S): Ruth A. Montag, George A. Corbin It is certified that error appears in the above-identified patent and that said Letters Patent is hereby corrected as shown below:

| Col. | Line | |
|------|------|---|
| 17 | 14 | "80/13/ parts by weight;" should read --80/13/7 parts by weight;-- |
| 18 | 60 | "280°-285°C./290°-295°C./290°-295°C." should read --280°-285°C./290°-295°C./290°-295°C./290°-295°C.-- |
| 24 | 54 | "ethylenic/butylene" should read --ethylene/butylene-- |
| 25 | 28 | "2,6-naphthalene dicarboxylamides; dicarboxylamides;" should read --2,6-naphthalene dicarboxylamides;-- |

Signed and Sealed this

Twentieth Day of June, 1995

BRUCE LEHMAN

*Attest:*

*Attesting Officer*    *Commissioner of Patents and Trademarks*